United States Patent
Iwata

(10) Patent No.: US 9,836,222 B2
(45) Date of Patent: Dec. 5, 2017

(54) STORAGE APPARATUS, STORAGE CONTROL METHOD, AND STORAGE SYSTEM

(71) Applicant: FUJITSU LIMITED, Kawasaki-shi, Kanagawa (JP)

(72) Inventor: Satoshi Iwata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/045,626

(22) Filed: Feb. 17, 2016

(65) Prior Publication Data

US 2016/0266796 A1 Sep. 15, 2016

(30) Foreign Application Priority Data

Mar. 10, 2015 (JP) ................................. 2015-047011

(51) Int. Cl.
  *G06F 3/06* (2006.01)
(52) U.S. Cl.
  CPC ............ *G06F 3/061* (2013.01); *G06F 3/0643* (2013.01); *G06F 3/0647* (2013.01); *G06F 3/0683* (2013.01)
(58) Field of Classification Search
  CPC .................................................. G06F 3/0647
  See application file for complete search history.

(56) References Cited

U.S. PATENT DOCUMENTS

| | | | |
|---|---|---|---|
| 2003/0140207 A1 | 7/2003 | Nagase et al. | |
| 2008/0027905 A1* | 1/2008 | Jensen | G06F 3/0613 |
| 2011/0010514 A1* | 1/2011 | Benhase | G06F 3/061 |
| | | | 711/162 |
| 2011/0035548 A1* | 2/2011 | Kimmel | G06F 3/061 |
| | | | 711/114 |
| 2012/0101973 A1* | 4/2012 | Ito | G06F 17/30221 |
| | | | 706/50 |
| 2016/0139821 A1* | 5/2016 | Dolph | G06F 3/0611 |
| | | | 711/103 |

FOREIGN PATENT DOCUMENTS

| | | |
|---|---|---|
| JP | 2003-216460 | 7/2003 |
| JP | 2014-041645 | 3/2014 |

* cited by examiner

*Primary Examiner* — Edward Dudek, Jr.
(74) *Attorney, Agent, or Firm* — Fujitsu Patent Center

(57) ABSTRACT

A control unit calculates the expected number of access operations to each recorded data set, and selects one or more recorded data sets as recorded data sets to be relocated, based on the expected number of access operations. The control unit calculates the expected number of access operations to each recorded data set, based on a calculation period and the number of access operations per unit time. The calculation period differs from one recorded data set to another, depending on the next update timing. If the next update timing is earlier than the next relocation timing, the calculation period is a period from the current relocation timing to the next update timing. On the other hand, if the next update timing is later than the next relocation timing, the calculation period is a period from the current relocation timing to the next relocation timing.

9 Claims, 11 Drawing Sheets

200 STATISTICAL INFORMATION MANAGEMENT TABLE

| FILE NAME | AVERAGE UPDATE TIME INTERVAL | LAST UPDATE TIME | NUMBER OF READS |
|---|---|---|---|
| A | 360 hours | 250 hours ago | 3,024 |
| B | 30 minutes | 15 minutes ago | 856 |
| C | 24 hours | 5 hours ago | 225,221 |
| ... | ... | ... | ... |

FIG. 5

210 CALCULATION RESULT SUMMARY TABLE

| GROUP ID | FILE NAME | EXPECTED NUMBER OF READS PER FILE | EXPECTED NUMBER OF READS PER GROUP |
|---|---|---|---|
| #0 | A | 5,022 | 228,351 |
| | E | 806 | |
| | F | 222,523 | |
| ... | ... | ... | ... |

220 STATISTICAL INFORMATION MANAGEMENT TABLE

| PAGE ID | AVERAGE UPDATE TIME INTERVAL | LAST UPDATE TIME | NUMBER OF READS |
|---|---|---|---|
| #P0 | 52 hours | 2 hours ago | 525 |
| #P1 | 22 minutes | 5 minutes ago | 24,220 |
| #P2 | 3,202 hours | 8,226 hours ago | 60,602 |
| ... | ... | ... | ... |

US 9,836,222 B2

STORAGE APPARATUS, STORAGE CONTROL METHOD, AND STORAGE SYSTEM

CROSS-REFERENCE TO RELATED APPLICATION

This application is based upon and claims the benefit of priority of the prior Japanese Patent Application No. 2015-047011, filed on Mar. 10, 2015, the entire contents of which are incorporated herein by reference.

FIELD

The embodiments discussed herein are related to a storage apparatus, a storage control method, and a storage system.

BACKGROUND

There are storage apparatuses that perform hierarchical control to store frequently-accessed data in a high-speed device such as a solid state drive (SSD) and the like, and to store infrequently-accessed data in a low-speed device such as a hard disk drive (HDD) and the like.

Such a storage apparatus often handles data managed by a log-structured file system. In this case, the storage apparatus makes a change to the data by adding instead of overwriting.

See for example, Japanese Laid-open Patent Publications No. 2003-216460, and No. 2014-041645.

In hierarchical control, the storage apparatus appropriately performs data relocation such that frequently-accessed data is placed in a high-speed device with a high access speed.

If an update is made to a file managed by the log-structured file system, the file after the update is stored in a location different from the location where the file before the updated is stored. Thus, after the update of the file, the location where the file after the update is stored is mostly accessed.

Accordingly, in the case where an update is made to a file managed by the log-structured file system after the file is relocated to a high-speed device, the frequency of access to the file before the update in the high-speed device decreases. This reduces the use efficiency of the high-speed device.

SUMMARY

According to one aspect of the invention, there is provided a storage apparatus that records data using a log-structured data writing method and relocates the data between a first storage device and a second storage device having a lower access speed than the first storage device. The storage apparatus includes a processor configured to perform a procedure including: calculating an expected number of access operations to each of recorded data sets, based on an earlier one of next update timing and next relocation timing of each of the recorded data sets, and a number of access operations to each of the recorded data sets per unit time, and placing one or more of the recorded data sets with a greater expected number of access operations in the first storage device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a statistical information management table according to the second embodiment;
FIG. 8 illustrates an example of a calculation result summary table according to the third embodiment;
FIG. 9 illustrates an example of a statistical information management table according to a fourth embodiment.

DESCRIPTION OF EMBODIMENTS

Figure 1:
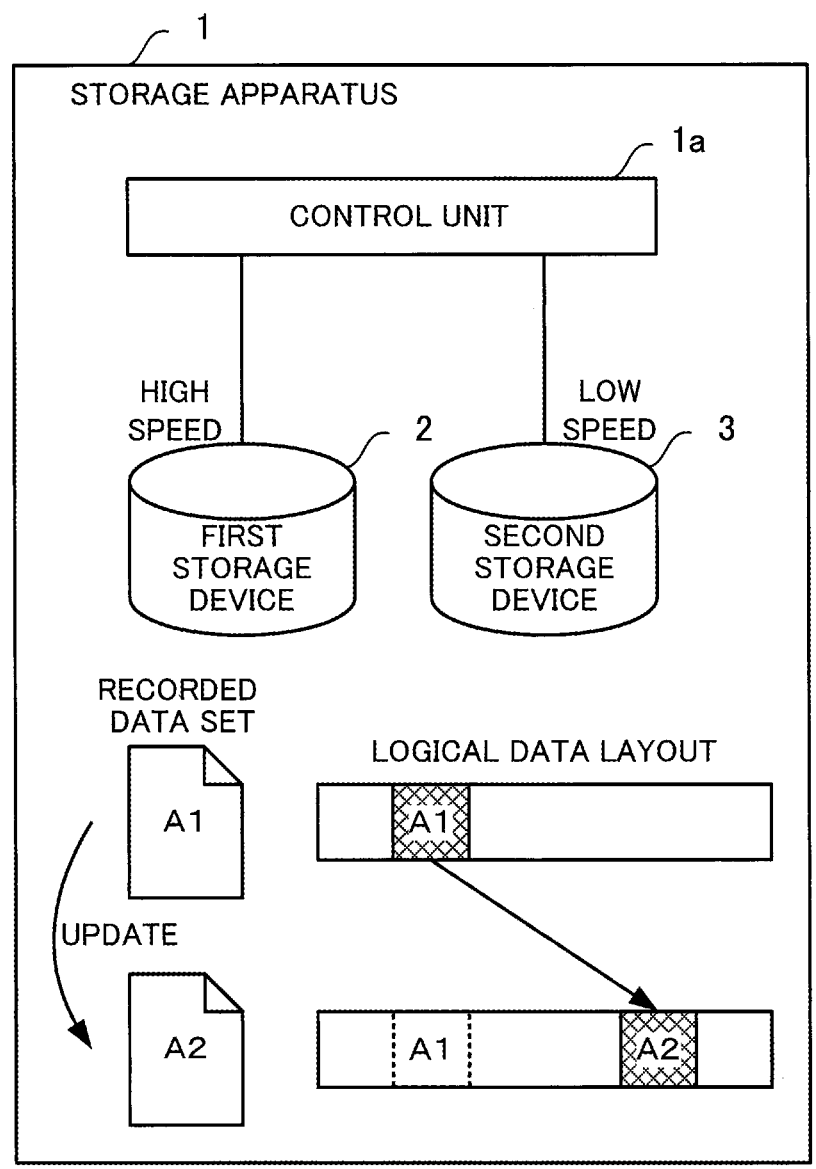
FIG. 1 illustrates an example of the configuration of a storage apparatus according to a first embodiment.

Several embodiments will be described below with reference to the accompanying drawings, wherein like reference numerals refer to like elements throughout.

(a) First Embodiment

First, a storage apparatus 1 of a first embodiment will be described with reference to FIG. 1. FIG. 1 illustrates an example of the configuration of the storage apparatus 1 according to the first embodiment.

The storage apparatus 1 includes a control unit 1a. The control unit 1a controls a first storage device 2 and a second storage device 3.

The first storage device 2 and the second storage device 3 have different access speeds. The first storage device 2 is a high-speed device with a higher access speed than the second storage device 3. In other words, the second storage device 3 is a low-speed device with a lower access speed than the first storage device 2. For example, in the case where the first storage device 2 is an SSD, the second storage device 3 is an HDD. As another example, in the case where the first storage device 2 is an online disk, the second storage device 3 is a nearline disk. The first storage device 2 is a faster but more expensive storage device than the second storage device 3. The second storage device 3 is a slower but higher capacity and less expensive storage device than the first storage device 2.

Note that the first storage device 2 and the second storage device 3 may be internal or external storage devices of the storage apparatus 1. Alternatively, the first storage device 2 and the second storage device 3 may be connected to the storage apparatus 1 through a network.

The control unit 1a is able to record data in the first storage device 2 and the second storage device 3, using a log-structured data writing method. The log-structured data writing method is a method of writing data after update to an area different from the area where data before update is stored. The data to be written may be in a file format or in other formats.

For example, a log-structured file system writes data in a file format. In this case, the control unit 1a is able to record a file in the first storage device 2 and the second storage device 3. When updating a recorded data set A1 to a recorded data set A2, the control unit 1a arranges the logical data layout such that the recorded data set A2 is stored in a location different from the location where the recorded data set A1 is stored.

Thus, the storage apparatus 1 is able to restore the recorded data set A1, after updating the recorded data set A1 to the recorded data set A2.

The control unit 1a is able to perform hierarchical control (automated storage tiering) that relocates data between the first storage device 2 and the second storage device 3.

Thus, the storage apparatus 1 places frequently-accessed data in a high-speed storage device, and relocates infrequently-accessed data to a low-speed storage device, thereby reducing the cost and increasing the access speed.

For example, the storage apparatus 1 relocates the frequently-accessed recorded data set A1 to a high-speed device, thereby increasing the use efficiency of the high-speed device. On the other hand, in the storage apparatus 1, if the recorded data set A1 is updated and the recorded data set A2 is recorded in a low-speed device according to the log-structured file system, this reduces the frequency of access to the recorded data set A1 relocated in the high-speed device.

The control unit 1a is able to prevent such a reduction in use efficiency of the high-speed device. The control unit 1a calculates the expected number of access operations to each of recorded data sets, and places one or more of the recorded data sets with a greater expected number of access operations in the first storage device 2. For example, the control unit 1a sorts recorded data sets by the expected number of access operations, and relocates one or more of the recorded data sets with a greater expected number of access operations to the relatively high-speed first storage device 2.

The expected number of access operations indicates how many times a recorded data set is expected to be accessed from the current relocation timing to the next relocation timing. The control unit 1a calculates the expected number of access operations to each of the recorded data sets, based on a calculation period and the number of access operations per unit time. The number of access operations per unit time may be obtained as a statistical value (mean, median, mode, or the like) from statistical information on each recorded data set, for example. In this case, the number of access operations per unit time may be obtained from the most recent statistical information (the period after the last update).

The calculation period differs from one recorded data set to another, depending on the next update timing. For example, the next update timing may be obtained as a statistical value (mean, median, mode, or the like) from statistical information on each recorded data set, for example. If the next update timing is earlier than the next relocation timing, the calculation period is a period from the current relocation timing to the next update timing. On the other hand, if the next update timing is later than the next relocation timing, the calculation period is a period from the current relocation timing to the next relocation timing.

Figure 2:
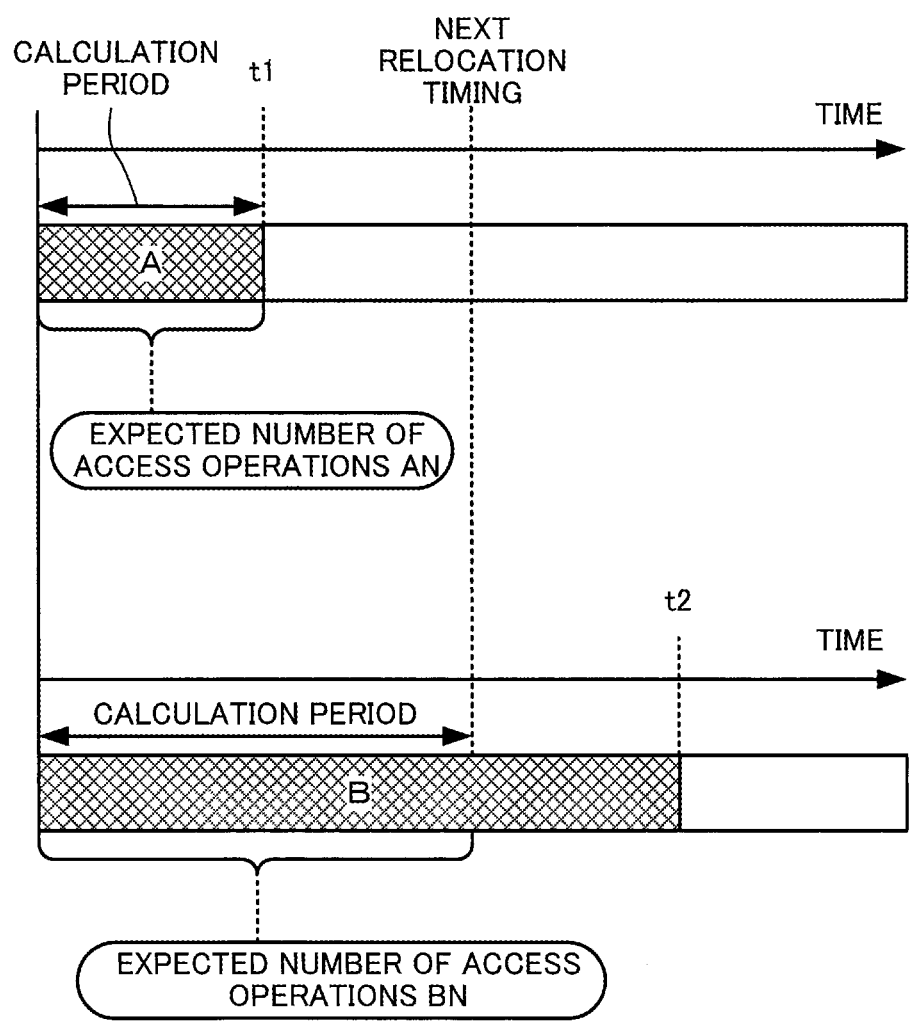
FIG. 2 illustrates an example of a calculation period.

In the following, the calculation period will be described with reference to FIG. 2. FIG. 2 illustrates an example of the calculation period.

For example, the next update timing t1 of the recorded data set A is earlier than the next relocation timing, and thus the calculation period of the recorded data set A is a period from the current relocation timing to the next update timing. Accordingly, the storage apparatus 1 may calculate an expected number of access operations AN to the recorded data set A, based on the calculation period and the number of access operations per unit time. Since a period from the next update timing t1 of the recorded data set A to the next relocation timing in which the frequency of access to the recorded data set A is reduced is excluded from the calculation period, the expected number of access operations AN is expected to be calculated with high accuracy.

On the other hand, the next update timing t2 of the recorded data set B is later than the next relocation timing, and thus the calculation period of the recorded data set B is a period from the current relocation timing to the next relocation timing. Accordingly, the storage apparatus 1 may calculate an expected number of access operations BN to the recorded data set B, based on the calculation period and the number of access operations per unit time.

Each of the expected number of access operations AN and the expected number of access operations BN appropriately represents the expected number of access operations to log-structured data.

For example, even in the case where the recorded data set A1 relocated in a high-speed device is updated and the recorded data set A2 is recorded in a low-speed device, the storage apparatus 1 is able to calculate the expected number of access operations in accordance with the update timing of the recorded data set A1.

Accordingly, the storage apparatus 1 is able to more accurately calculate the expected number of access operations to log-structured data. Thus, the storage apparatus 1 is able to relocate data based on the accurately-calculated expected number of access operations, thereby realizing hierarchical control capable of improving the use efficiency of the high-speed device.

(b) Second Embodiment

Figure 3:
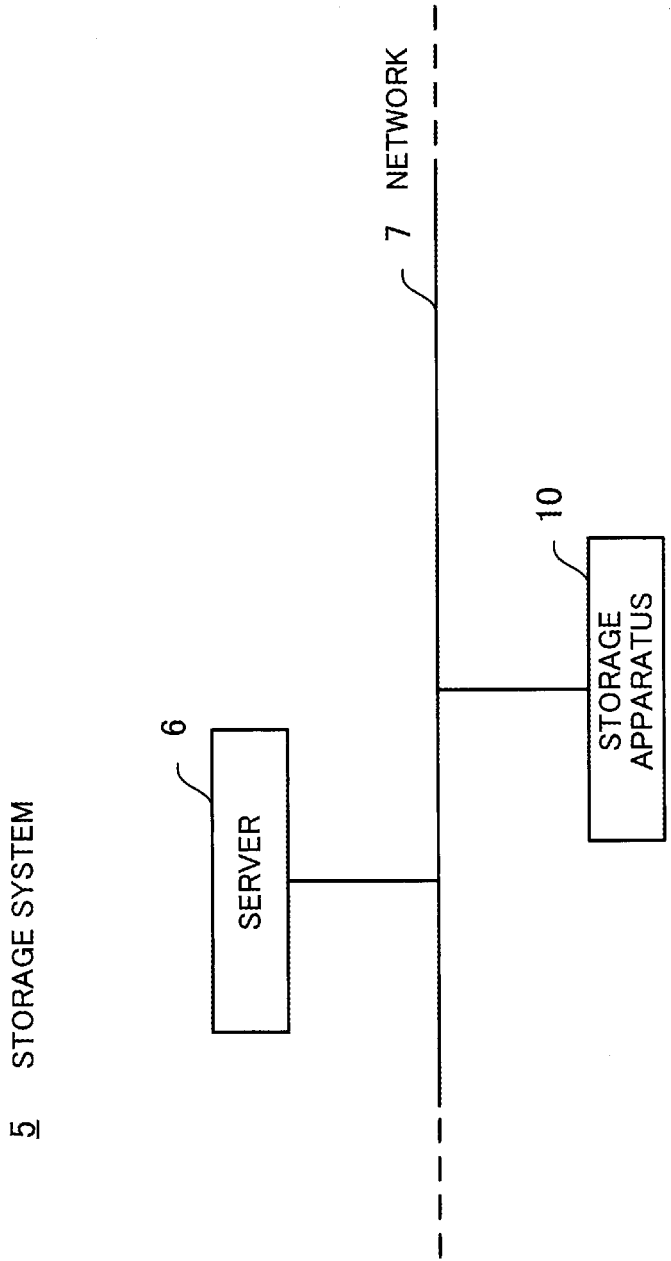
FIG. 3 illustrates an example of the configuration of a storage system according to a second embodiment.

Next, a storage system 5 of a second embodiment will be described with reference to FIG. 3. FIG. 3 illustrates an example of the configuration of the storage system 5 according to the second embodiment.

The storage system 5 includes a server (information processing apparatus) 6, a network 7, and a storage apparatus 10. The network 7 connects, for example, at least one storage apparatus 10 and at least one server 6 to each other. The storage apparatus 10 is connected to the server 6 for communication through the network 7. The server 6 is able to write data to the storage apparatus 10, and read data from the storage apparatus 10.

Figure 4:
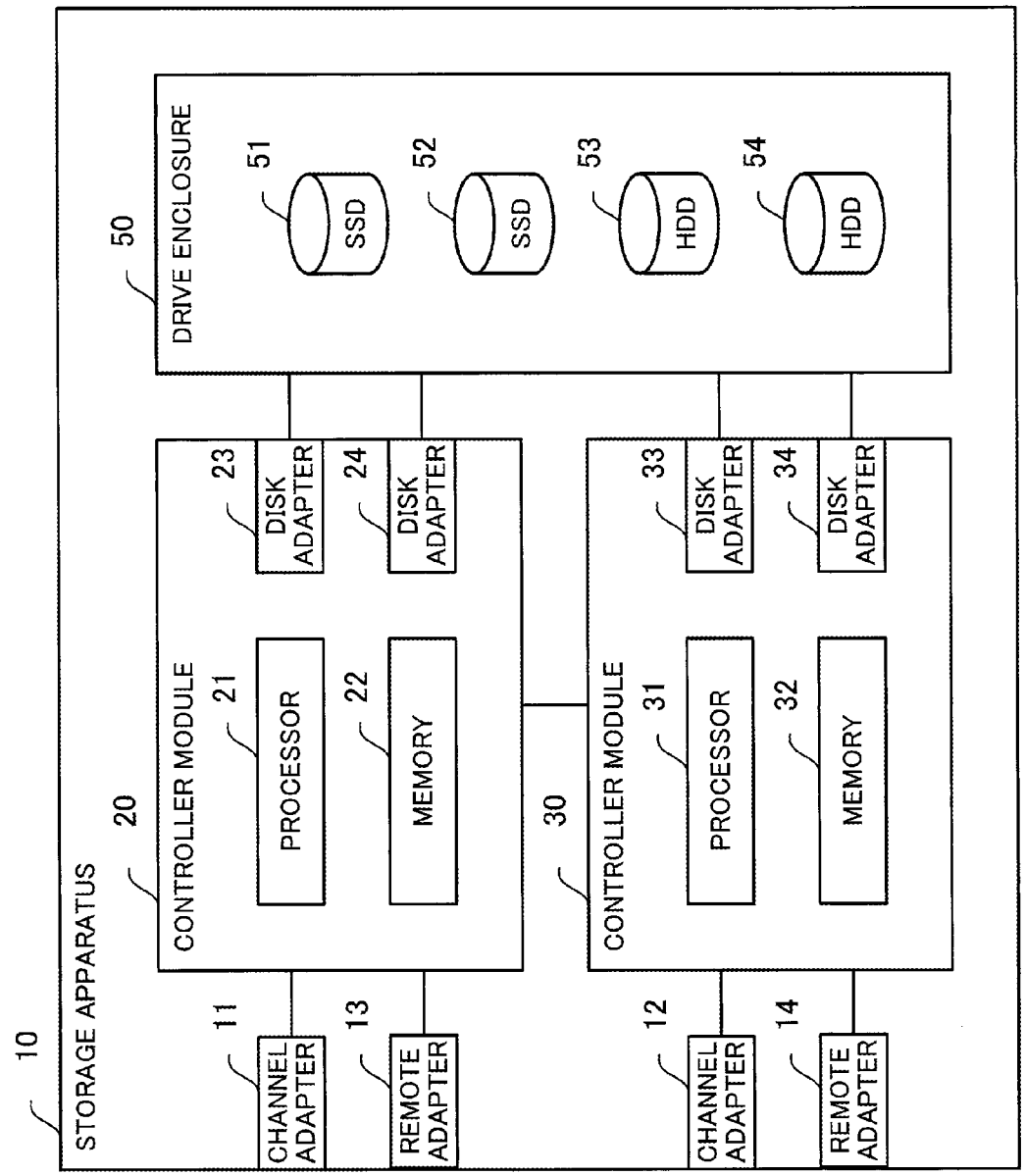
FIG. 4 illustrates an example of the configuration of a storage apparatus according to the second embodiment.

Next, the storage apparatus 10 according to the second embodiment will be described with reference to FIG. 4. FIG. 4 illustrates an example of the configuration of the storage apparatus 10 according to the second embodiment.

The storage apparatus 10 includes channel adapters 11 and 12, remote adapters 13 and 14, controller modules (CMs) 20 and 30, and a drive enclosure (DE) 50.

The storage apparatus 10 is connected to the server 6 via the channel adapters 11 and 12. The channel adapter 11 is provided for the controller module 20, while the channel adapter 12 is provided for the controller module 30. The storage apparatus 10 is connectable to other storage apparatuses via the remote adapters 13 and 14. The remote adapter 13 is provided for the controller module 20, while the remote adapter 14 is provided for the controller module 30.

The drive enclosure 50 includes SSDs 51 and 52 and HDDs 53 and 54. The SSDs 51 and 52 and the HDDs 53 and 54 are storage devices having different access speeds. The SSDs 51 and 52 are high-speed devices having a higher access speed than the HDDs 53 and 54. In other words, the HDDs 53 and 54 are low-speed devices having a lower access speed than the SSDs 51 and 52. In general, the HDDs 53 and 54 have a greater capacity and are less expensive than the SSDs 51 and 52.

Although the drive enclosure 50 includes the SSDs 51 and 52 and the HDDs 53 and 54, the combination of storage devices having different access speeds is not limited thereto. For example, the combination may be a combination of a nearline disk and an online disk, a combination of an HDD and a tape storage, or other combinations than these. Further, the storage devices having different access speeds may be included in two or more drive enclosures 50. In this case, the storage devices having different access speeds may be included in different drive enclosures.

The controller module 20 and the controller module 30 are able to connect to each other so as to share the workload. Note that although the storage apparatus 10 includes two controller modules 20 and 30, the storage apparatus 10 may include either one of the controller module 20 and the controller module 30, or may include three or more, for example four or eight, controller modules.

The controller module 20 includes a processor 21, a memory 22, and disk adapters 23 and 24. The controller module 30 includes a processor 31, a memory 32, and disk adapters 33 and 34. Note that the controller module 30 has the same configuration as the controller module 20, and therefore the description below of the controller module 20 applies to the controller module 30 as well.

The processor 21, the memory 22, and the disk adapters 23 and 24 are connected to each other via a bus (not illustrated). The processor 21 controls the entire controller module 20, and performs storage control including hierarchical control. Note that the processor 21 may be a multi-processor. The processor 21 may be, for example, a central processing unit (CPU), a micro processing unit (MPU), a digital signal processor (DSP), an application specific integrated circuit (ASIC), or a programmable logic device (PLD). Alternatively, the processor 21 may be a combination of two or more selected from CPU, MPU, DSP, ASIC, and PLD.

The memory 22 holds data read from the SSDs 51 and 52 or the HDDs 53 and 54, and serves as a buffer when writing data to the SSDs 51 and 52 or the HDDs 53 and 54. Further, the memory 22 stores user data and control information.

The memory 22 includes a RAM (random access memory) and a non-volatile memory, for example. The RAM serves as a primary storage device of the controller module 20. The RAM temporarily stores at least part of an operating system program, firmware, and application programs that are executed by the processor 21. The RAM also stores various types of data that are used for processing by the processor 21. The RAM may include a cache memory, separately from a memory for storing various types of data.

The non-volatile memory retains stored data even when power of the storage apparatus 10 is removed. Examples of non-volatile memories include a semiconductor memory device (such as electrically erasable and programmable ROM (EEPROM), flash memory, and the like), HDD, and so on. The non-volatile memory serves as a secondary storage device of the controller module 20. The non-volatile memory stores the operating system program, firmware, application programs, and various types of data.

Examples of peripheral devices connected to the bus include an input and output interface and a communication interface. The input and output interface is connected to an input and output device so as to perform input and output operations. The input and output interface transmits signals and data transmitted from storage devices, such as the HDDs and the like, to the processor 21 and the memory 22. Further, the input and output interface outputs signals received from the processor 21, to other control units and output devices connected to the controller module 20. The communication interface transmits data to and receives data from the other controller module (controller module 30) in the storage apparatus 10.

The disk adapters 23 and 24 perform interface control (access control) for the SSDs 51 and 52 and the HDDs 53 and 54.

With the hardware configuration described above, it is possible to realize the processing functions of the storage apparatus 10 or the controller modules 20 and 30. Note that the storage apparatus 1 of the first embodiment may be realized with a hardware configuration similar to that of the storage apparatus 10 or that of the controller modules 20 and 30.

Next, statistical information used for hierarchical control will be described with reference to FIG. 5. FIG. 5 illustrates an example of a statistical information management table 200 according to the second embodiment.

The statistical information management table 200 is information used for selecting a file to be relocated, upon performing file relocation in hierarchical control. The storage apparatus 10 is able to generate the statistical information management table 200, based on information obtained from the log-structured file system. Note that, a hierarchical control module that performs hierarchical control and the log-structured file system may be implemented as part of the storage control functions of the controller modules 20 and 30. The log-structured file system may alternatively be implemented as part of the information processing function of an information processing apparatus (for example, the server 6 or the like) at a higher level than that of the storage apparatus 10.

The hierarchical control module obtains, from the log-structured file system, the update time and the number of reads of each file, at predetermined time intervals. The hierarchical control module is able to sum up the obtained information so as to generate the statistical information management table 200.

The statistical information management table 200 stores information on each file, and includes the following items: file name; average update time interval; the last update time; and the number of reads. The file name is information for identifying the file. The average update time interval indicates the average of the update time interval of the file. Note that the average update time interval may be information that indicates the update time interval represented by another statistical value such as the mean, mode, and so on. The last update time indicates the time when the file was last updated. The number of reads indicates the number of times the file was read per unit time (for example, 24 hours).

According to the statistical information management table 200, for example, as for a file with the file name "A", the average update time interval is "360 hours"; the last update time is "250 hours ago"; and the number of reads is "3,024". As for a file with the file name "B", the average update time interval is "30 minutes"; the last update time is "15 minutes ago"; and the number of reads is "856". As for a file with the file name "C", the average update time interval is "24 hours"; the last update time is "5 hours ago"; and the number of reads is "225,221".

Note that the number of reads may be the number of access operations including the number of writes. However, in the log-structured file system, the location where the most recent data is stored is moved when writing is performed. Therefore, even if writing is performed many times, there are few benefits in placing the file in a high-speed device. The storage apparatus 10 performs file relocation based on the number of reads included in the number of access operations, and thereby achieves an improved accuracy in relocation control.

In the above description, the hierarchical control module obtains information from the log-structured file system. However, the hierarchical control module or a separately provided statistical information generation module may obtain information on each file by performing polling. In this case, the statistical information generation module may be implemented as part of the storage control functions of the controller modules 20 and 30.

Figure 6:
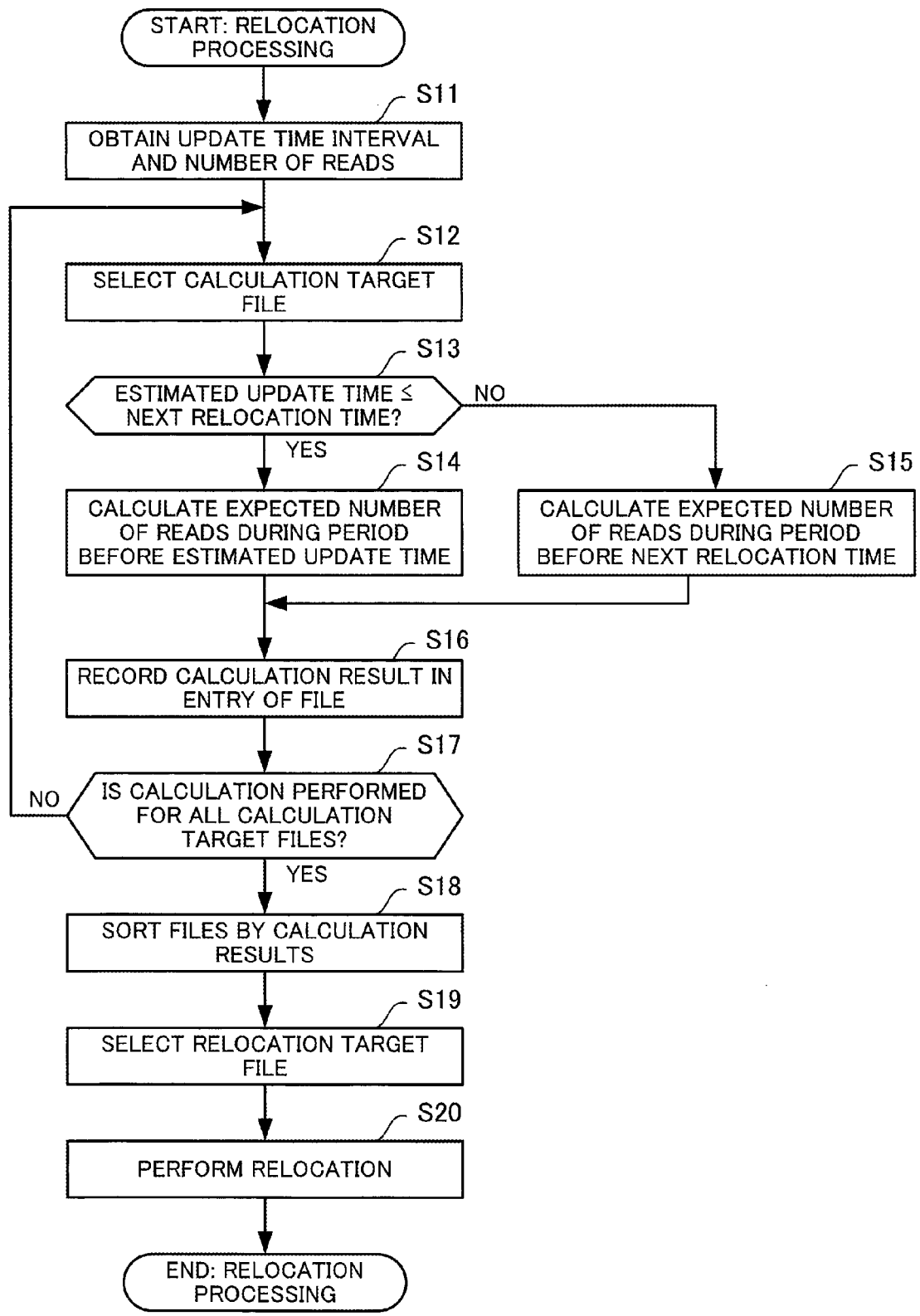
FIG. 6 is a flowchart of relocation processing according to the second embodiment.

Next, relocation processing according to the second embodiment will be described with reference to FIG. 6. FIG. 6 is a flowchart of relocation processing according to the second embodiment.

The relocation processing is processing that relocates one or more files expected to have a greater number of reads (one or more files with a greater expected number of reads) during the period before the next relocation to a high-speed device. The hierarchical control module performs the relocation processing at predetermined execution time or a predetermined execution cycle. Note that the statistical information management table 200 described above is updated at a cycle sufficiently shorter than the execution cycle of the relocation processing.

(Step S11) The hierarchical control module obtains the update time interval and the number of reads of each of files from the statistical information management table 200.

(Step S12) The hierarchical control module selects one of the files as a calculation target file.

(Step S13) The hierarchical control module compares the estimated update time of the calculation target file and the next relocation time. If the estimated update time of the calculation target file is equal to or earlier than the next relocation time, the process proceeds to step S14. On the other hand, if the estimated update time of the calculation target file is later than the next relocation time, the process proceeds to step S15.

The estimated update time of the calculation target file may be calculated based on the last update time and the average update time interval, using an equation (1), for example.

$$\text{Estimated Update Time} = \text{Last Update Time} + \text{Average Update Time Interval} \quad (1)$$

(Step S14) The hierarchical control module specifies, for the calculation target file, a period from calculation start time to the estimated update time as a calculation target period, and calculates the expected number of reads based on the number of reads of the calculation target file. The expected number of reads calculated in step S14 is the expected number of reads during a part of the original calculation period from the calculation start time to the next relocation time, and therefore is hereinafter referred to as "the expected number of reads (partial period)". The expected number of reads (partial period) may be calculated using an equation (2), for example.

$$\text{Expected Number of Reads (Partial Period)} = (\text{Estimated Update Time} - \text{Calculation Start Time}) \times (\text{Number of Reads per Unit Time}) \quad (2)$$

Note that the calculation start time may be the current time, or may be the current relocation time. The current relocation time is the time when relocation is scheduled to occur in the current relocation processing. The next relocation time is the time when relocation is scheduled to occur in the next relocation processing.

(Step S15) The hierarchical control module specifies, for the calculation target file, a period from calculation start time to the next relocation time as a calculation target period, and calculates the expected number of reads based on the number of reads of the calculation target file. The expected number of reads calculated in step S15 is the expected number of reads during the entire original calculation period from the calculation start time to the next relocation time, and therefore is hereinafter referred to as "the expected number of reads (entire period)". The expected number of reads (entire period) may be calculated using an equation (3), for example.

$$\text{Expected Number of Reads (Entire Period)} = (\text{Next Relocation Time} - \text{Calculation Start Time}) \times (\text{Number of Reads per Unit Time}) \quad (3)$$

(Step S16) The hierarchical control module records the calculation result in an entry of the file.

(Step S17) The hierarchical control module determines whether the expected number of reads is calculated for all the calculation target files. If the expected number of reads is calculated for all the calculation target files, the process proceeds to step S18. If the expected number of reads is not calculated for all the calculation target files, the process returns to step S12.

(Step S18) The hierarchical control module sorts all the files by the calculation results. For example, the hierarchical control module sorts all the files in descending order of the expected number of reads, using the expected number of reads as a sort key.

(Step S19) The hierarchical control module selects one or more relocation target files to be placed in a high-speed device, based on the result of sorting all the files. For example, the hierarchical control module selects a predetermined number of files as relocation target files in descending order of the expected number of reads, until the total size reaches a predetermined size.

(Step S20) The hierarchical control module performs relocation that places the relocation target files in the high-speed device in units of files. Thus, the relocation processing ends.

Note that a file is a management unit of data in the log-structured file system, and the log-structured file system is able to identify data by the file name, for example. Each file includes one or more pages. A page is a management unit of data smaller than a file.

Further, after placing the relocation target files in the high-speed device, the hierarchical control module resets the number of reads in the statistical information management table 200. Thus, the hierarchical control module is able to perform hierarchical control based on the number of reads to which the most recent access pattern is reflected, in accordance with the file access pattern that varies with time.

Accordingly, even for files stored in the log-structured file system, the storage apparatus 10 is able to more accurately estimate the number of reads of a file in the case where the file is placed in the high-speed device. Thus, even if data is updated after relocating a frequently-accessed file to a high-speed device, the storage apparatus 10 is able to calculate the expected number of reads, taking into account a reduction in access frequency due to a movement of storage location of the most recent data. Since relocation of a file to the high-speed device is performed based on the thus calculated expected number of reads, the storage apparatus 10 is able to remove the inefficiency resulting from a reduction in access frequency due to a data update after relocation of a frequently-accessed file to a high-speed device. Accordingly, the storage apparatus 10 is able to increase the percentage of requests that are processed at a high speed, and improve the use efficiency of the high-speed device in the hierarchical control.

(c) Third Embodiment

Next, a storage system of a third embodiment will be described. The storage system of the third embodiment is different from the storage system of the second embodiment in the relocation unit of data in the hierarchical control. Although the storage system of the second embodiment relocates data to a high-speed device in units of files, the storage system of the third embodiment relocates data to a high-speed device in units of groups each including one or more files. Note that the storage system and a storage apparatus of the third embodiment have the same configuration as the storage system and the storage apparatus of the second embodiment. Accordingly, elements of the third embodiments corresponding to those of the second embodiment are denoted by the same reference numerals, and a description thereof will be omitted.

Figure 7:
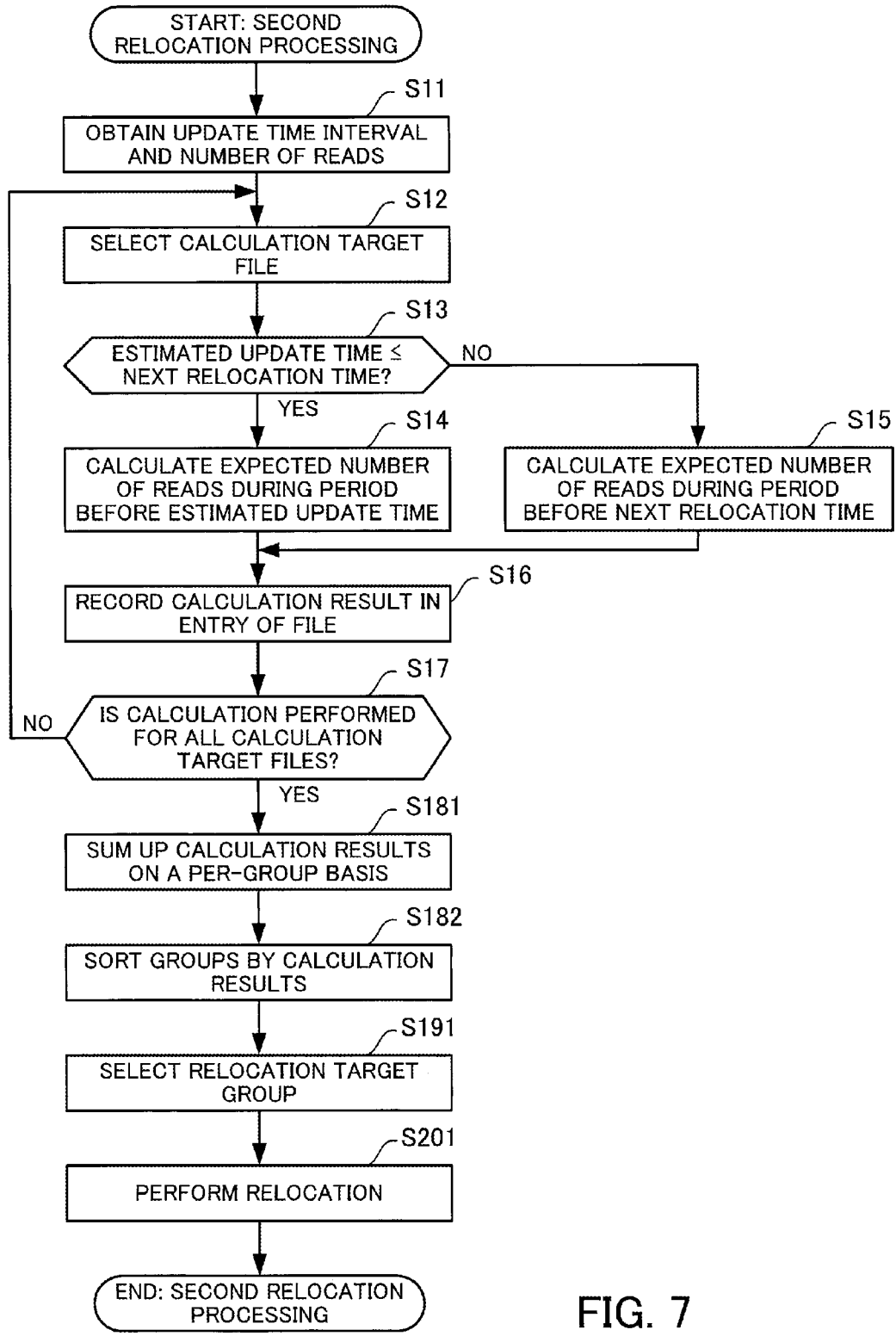
FIG. 7 is a flowchart of second relocation processing according to a third embodiment.

First, relocation processing according to the third embodiment will be described with reference to FIG. 7. FIG. 7 is a flowchart of second relocation processing according to the third embodiment.

The second relocation processing is a modified example of the relocation processing of the second embodiment. The second relocation processing is processing that relocates one or more file groups with a greater expected number of reads to a high-speed device. The hierarchical control module performs the second relocation processing at predetermined execution time or a predetermined execution cycle.

Note that the statistical information management table 200 of the second embodiment is information used for selecting a file to be relocated, upon performing file relocation in hierarchical control in the second relocation processing as well. Further, the statistical information management table 200 is updated at a cycle sufficiently shorter than the execution cycle of the second relocation processing.

Steps S11 through S17 are the same as steps S11 through S17 of the relocation processing of the second embodiment, and a description thereof will be omitted.

(Step S181) The hierarchical control module sums up the calculation results on a per-group basis so as to generate a calculation result summary table. The calculation result summary table will be described below with reference to FIG. 8.

(Step S182) The hierarchical control module sorts the groups by the calculation results. For example, the hierarchical control module sorts all the groups in descending order of the reads per group), using the sum of the expected number of reads of each of grouped files (the expected number of reads per group) as a sort key.

(Step S191) The hierarchical control module selects one or more relocation target groups to be placed in a high-speed device, based on the result of sorting all the groups. For example, the hierarchical control module selects a predetermined number of groups in descending order of the expected number of reads, until the total size reaches a predetermined size.

(Step S201) The hierarchical control module performs relocation that places the relocation target groups in the high-speed device in units of groups. Thus, the second relocation processing ends.

Note that, after placing the relocation target groups in the high-speed device, the hierarchical control module resets the number of reads of each file in the statistical information management table 200. Thus, the hierarchical control module is able to perform hierarchical control based on the number of reads to which the most recent access pattern is reflected, in accordance with the file access pattern that varies with time.

Next, a calculation result summary table 210 will be described with reference to FIG. 8. FIG. 8 illustrates an example of the calculation result summary table 210 according to the third embodiment.

The calculation result summary table 210 is information used for selecting a file to be relocated, upon performing file relocation in hierarchical control. The calculation result summary table 210 may be generated based on the statistical information management table 200.

The calculation result summary table 210 stores information on each group, and includes the following items: group identification (ID); file name; the expected number of reads per file; and the expected number of reads per group.

The group ID is information for identifying the group. A group is a unit for grouping one or more files. Each group corresponds to a continuous storage area (segment) of a predetermined size (for example, from several megabytes to several gigabytes) that is accessible at a time.

The file name is information for identifying the file. The expected number of reads per file indicates the expected number of reads of each file, and is calculated based on the statistical information management table 200. More specifically, the expected number of reads per file is the expected number of reads (partial period) that is calculated for each file in step S14 of the second relocation processing, or the expected number of reads (entire period) that is calculated for each file in step S15. The expected number of reads per group indicates the expected number of reads of each group, that is, the sum of the expected number of reads of each of files included in a group.

According to the calculation result summary table 210, for example, a group identified by the group ID "#0" includes three files with the file name "A", the file name "E", and the file name "F". As for the file with the file name "A", the expected number of reads per file is "5,022"; as for the file with file name "E", the expected number of reads is "806"; and as for the file with the file name "F", the expected number of reads is 222,523". As for the group identified with the group ID "#0", the expected number of reads per group is "228,351 (=5,022+806+222,523)".

Note that if a group is a segment, a single file is often placed across a plurality of segments. In the case where a single file is placed across a plurality of segments, the hierarchical control module may add the expected number of reads of the file, for each of the segments across which the file is placed. Thus, the storage apparatus 10 is able to easily calculate the expected number of reads of each group. Further, in the case of adding the expected number of reads of the file, the hierarchical control module may add the number of reads that is prorated based on the number of segments across which the file is placed.

Accordingly, the storage apparatus 10 is able to perform data relocation in units of groups, for files stored in the log-structured file system. The storage apparatus 10 is able to remove the inefficiency resulting from a reduction in access frequency due to a data update after relocation of a frequently-accessed file to a high-speed device. Accordingly, the storage apparatus 10 is able to increase the percentage of requests that are processed at a high speed, and improve the use efficiency of the high-speed device in the hierarchical control.

(d) Fourth Embodiment

Next, a storage system of a fourth embodiment will be described. The storage system of the fourth embodiment is different from the storage system of the second embodiment and the storage system of the third embodiment in the collection unit of data used for generating statistical information, and the relocation unit of data in the hierarchical control. More specifically, the storage system of the second embodiment and the storage system of the third embodiment collect data on each file to be used for generating statistical information. However, the storage system of the fourth embodiment is different in collecting data on each page. Further, the storage system of the second embodiment relocates data to a high-speed device in units of files, and the storage system of the third embodiment relocates data in units of groups each including one or more files. However, the storage system of the fourth embodiment is different from the storage system of the second embodiment and the storage system of the third embodiment in relocating data to a high-speed device in units of pages. Note that the storage system and a storage apparatus of the fourth embodiment have the same configuration as the storage system and the storage apparatus of the second embodiment. Accordingly, elements of the fourth embodiments corresponding to those of the second embodiment are denoted by the same reference numerals, and a description thereof will be omitted.

First, statistical information used for hierarchical control will be described with reference to FIG. 9. FIG. 9 illustrates an example of a statistical information management table 220 according to the fourth embodiment.

The statistical information management table 220 is information that is used for selecting a page to be relocated, upon performing file relocation in hierarchical control. The storage apparatus 10 is able to generate the statistical information management table 220, based on information obtained from the log-structured file system.

The hierarchical control module obtains, from the log-structured file system, the update time and the number of reads of each page, at predetermined time intervals. The hierarchical control module is able to sum up the obtained information so as to generate the statistical information management table 220.

The statistical information management table 220 stores information on each page, and includes the following items: page ID; average update time interval; the last update time; and the number of reads. The page ID is information for identifying the page. A page is a management unit of data of a fixed size in the log-structured file system. For example, a page size is the minimum access unit of the device.

Note that a file of a size less than the one page size includes only one page. A file of a size greater than the one page size includes a plurality of pages. For example, if the page size is 4 KB, a file of 1 MB includes 256 pages.

The average update time interval indicates the average of the update time interval of the page. The last update time indicates the time when the page was last updated. The number of reads indicates the number of times the page was read per unit time.

According to the statistical information management table 220, for example, as for a page identified by the page ID "#P0", the average update time interval is "52 hours"; the last update time is "2 hours ago"; and the number of reads is "525". As for a page identified by the page ID "#P1", the average update time interval is "22 minutes"; the last update time is "5 minutes ago"; and the number of reads is "24,220". As for a page identified by the page ID "#P2", the average update time interval is "3,202 hours"; the last update time is "8,226 hours"; and the number of reads is "60,602".

Figure 10:
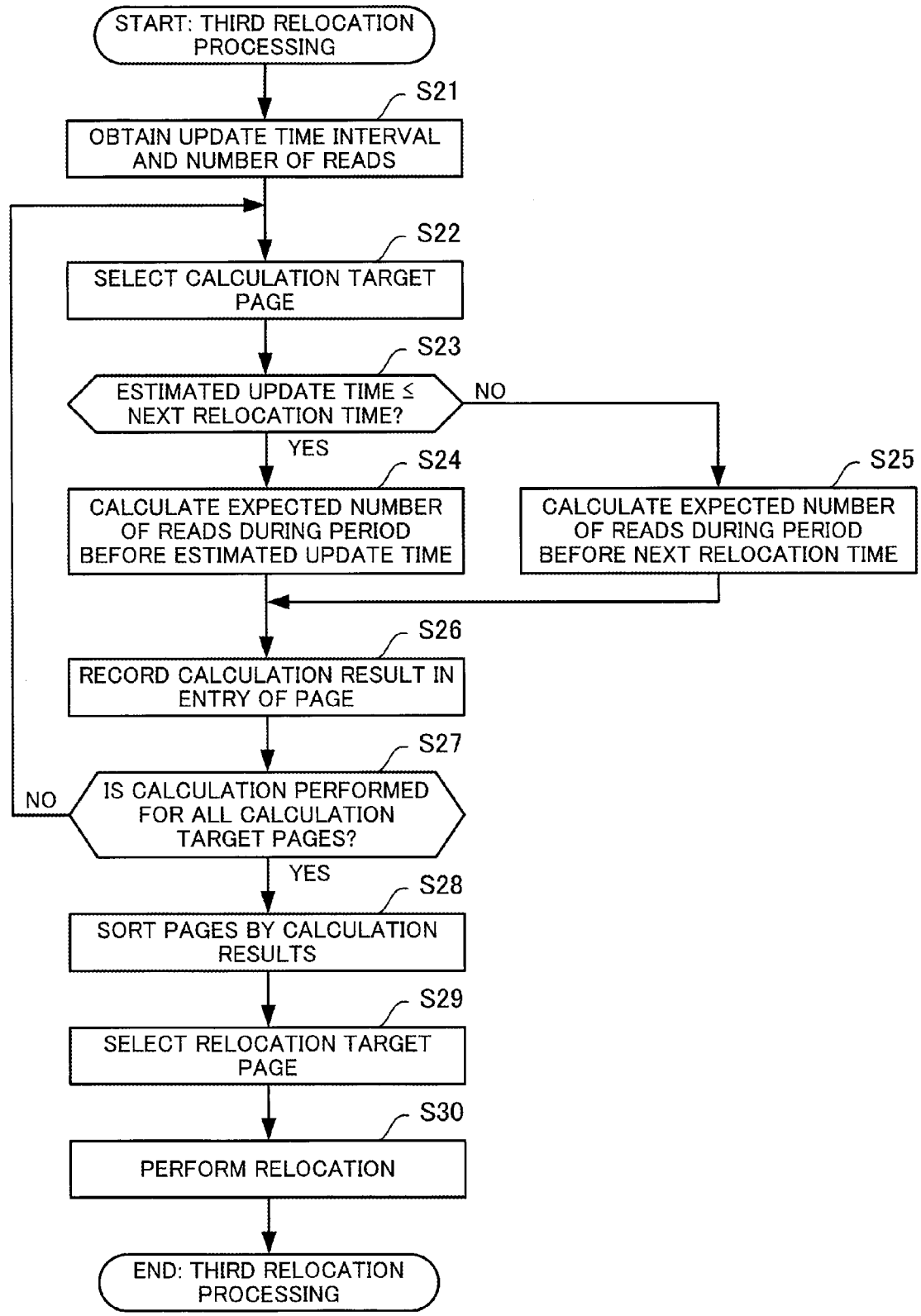
FIG. 10 is a flowchart of third relocation processing according to the fourth embodiment.

Next, relocation processing according to the fourth embodiment will be described with reference to FIG. 10. FIG. 10 is a flowchart of third relocation processing according to the fourth embodiment.

The third relocation processing is a modified example of the relocation processing of the second embodiment. The third relocation processing is processing that relocates one or more pages with a greater expected number of reads to a high-speed device. The hierarchical control module performs the third relocation processing at predetermined execution time or a predetermined execution cycle. Note that the statistical information management table 220 is updated at a cycle sufficiently shorter than the execution cycle of the third relocation processing.

(Step S21) The hierarchical control module obtains the update time interval and the number of reads of each of pages from the statistical information management table 220.

(Step S22) The hierarchical control module selects one of the pages as a calculation target page.

(Step S23) The hierarchical control module compares the estimated update time of the calculation target page and the next relocation time. If the estimated update time of the calculation target page is equal to or earlier than the next relocation time, the process proceeds to step S24. On the other hand, if the estimated update time of the calculation target page is later than the next relocation time, the process proceeds to step S25.

The estimated update time of the calculation target page may be calculated based on the last update time and the average update time interval, using the equation (1), for example.

(Step S24) The hierarchical control module specifies, for the calculation target page, a period from calculation start time to the estimated update time as a calculation target period, and calculates the expected number of reads (partial period) based on the number of reads of the calculation target page. The expected number of reads (partial period) may be calculated using the equation (2), for example.

(Step S25) The hierarchical control module specifies, for the calculation target page, a period from calculation start time to the next relocation time as a calculation target period, and calculates the expected number of reads (entire period) based on the number of reads of the calculation target page. The expected number of reads (entire period) may be calculated using the equation (3), for example.

(Step S26) The hierarchical control module records the calculation result in an entry of the page.

(Step S27) The hierarchical control module determines whether the expected number of reads is calculated for all the calculation target pages. If the expected number of reads is calculated for all the calculation target pages, the process proceeds to step S28. If the expected number of reads is not calculated for all the calculation target pages, the process returns to step S22.

(Step S28) The hierarchical control module sorts the pages by the calculation results. For example, the hierarchical control module sorts all the pages in descending order of the expected number of reads, using the expected number of reads as a sort key.

(Step S29) The hierarchical control module selects one or more relocation target pages to be placed in a high-speed device, based on the result of sorting all the pages. For example, the hierarchical control module selects a predetermined number of pages in descending order of the expected number of reads.

(Step S30) The hierarchical control module performs relocation that places the relocation target pages in the high-speed device in units of pages. Thus, the third relocation processing ends.

Note that, after placing the relocation target pages in the high-speed device, the hierarchical control module resets the number of reads of each page in the statistical information management table 220. Thus, the hierarchical control module is able to perform hierarchical control based on the number of reads to which the most recent access pattern is reflected, in accordance with the page access pattern that varies with time.

Accordingly, the storage apparatus 10 is able to perform data relocation in units of pages, for files stored in the log-structured file system. Thus, the storage apparatus 10 selects relocation target data based on a more detailed level of statistical information, and thereby performs relocation of data to a high-speed device more efficiently.

The storage apparatus 10 is able to remove the inefficiency resulting from a reduction in access frequency due to a data update after relocation of a frequently-accessed file to a high-speed device. Accordingly, the storage apparatus 10 is able to increase the percentage of requests that are processed at a high speed, and improve the use efficiency of the high-speed device in the hierarchical control.

(e) Modified Example of Second Embodiment Through Fourth Embodiment

In the second embodiment, the expected number of reads of each file is calculated based on the statistical information on each file, and data is relocated to a high-speed device in units of files. In the third embodiment, the expected number of reads of each group is calculated based on the statistical information on each group, and data is relocated to a high-speed device in units of groups. In the fourth embodiment, the expected number of reads of each page is calculated based on the statistical information on each page, and data is relocated to a high-speed device in units of pages. There may be other combinations of the unit of collection of statistical information and the unit of relocation to a high-speed device.

For example, the storage apparatus 10 may calculate the expected number of reads of each file based on the statistical information on each page, and relocate data to a high-speed device in units of files. Alternatively, the storage apparatus 10 may calculate the expected number of reads of each group based on the statistical information on each page, and relocate data to a high-speed device in units of groups. With such combinations of the unit of collection of statistical information and the unit of relocation to a high-speed device, the storage apparatus 10 is able to increase the percentage of requests that are processed at a high speed, and improve the use efficiency of the high-speed device in the hierarchical control.

(f) Fifth Embodiment

Figure 11:
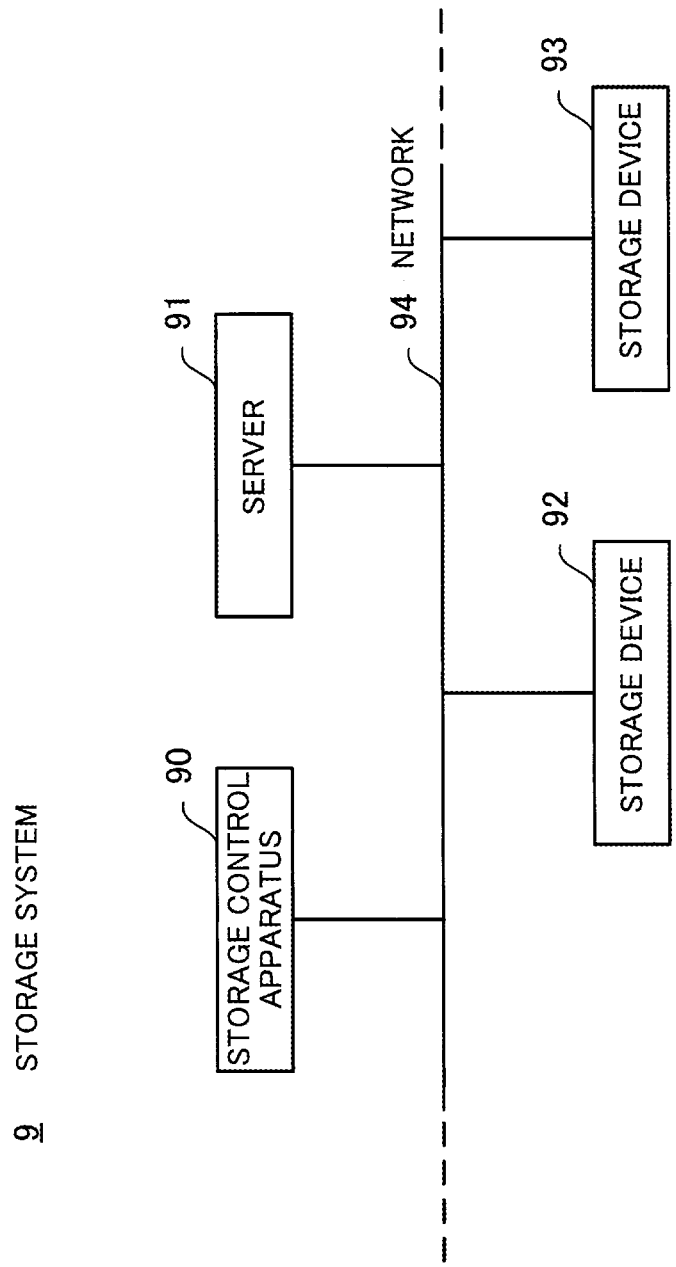
FIG. 11 illustrates an example of the configuration of a storage system according to a fifth embodiment.

Next, the configuration of a storage system 9 of a fifth embodiment will be described with reference to FIG. 11. FIG. 11 illustrates an example of the configuration of the storage system 9 according to the fifth embodiment.

The storage system 9 includes a storage control apparatus 90, a server 91, storage devices 92 and 93, and a network 94. The storage device 92 and the storage device 93 have different access speeds. The storage device 92 is a high-speed device with a higher access speed than the storage device 93. In other words, the storage device 93 is a low-speed device with a lower access speed than the storage device 92. In general, the storage device 93 has a greater capacity and is less expensive than the storage device 92. For example, the storage device 92 is an SSD, and the storage device 93 is an HDD.

Note that the combination of the storage device and the storage device 93 is not limited to a combination of an SSD and an HDD. For example, the combination may be a combination of a nearline disk and an online disk, a combination of an HDD and a tape storage, or other combinations than these.

The network 94 connects, for example, at least one storage control apparatus 90 and at least one server 91, at least one storage device 92, and at least one storage device 93 to each other.

The storage control apparatus 90 is connected to the storage device 92 and the storage device 93 for communication through the network 94. Similar to the controller modules 20 and 30 of the second embodiment, the storage control apparatus 90 is able to perform hierarchical control on the storage device 92 and the storage device 93.

The server 91 is able to write data to the storage device 92 or the storage device 93, and read data from the storage device 92 or the storage device 93. Note that the server 91 may include the functions of the storage control apparatus 90, and be integral with the storage control apparatus 90.

In this manner, the storage system 9 includes the storage control apparatus 90, the storage device 92, and the storage device 93 as separate units, which are connected to each other through the network 94. Even with this configuration, as in the case of the storage apparatuses 1 and 10 described in the first through fourth embodiments, the storage system 9 is able to improve the use efficiency of the high-speed device in the hierarchical control.

The above-described processing functions may be implemented by a computer. In this case, a program describing operations of the functions of the storage apparatus 1, the storage apparatus 10, or the storage control apparatus 90 is provided. When the program is executed by a computer, the above-described processing functions are implemented on the computer. The program describing operations of the functions may be stored in a computer-readable storage medium. Examples of computer-readable storage media include magnetic storage devices, optical discs, magneto-optical storage media, semiconductor memory devices, and the like. Examples of magnetic storage devices include hard disk drive (HDD), flexible disk (FD), magnetic tapes, and the like. Examples of optical discs include digital versatile disk (DVD), DVD-RAM, CD-ROM, CD-RW, and the like. Examples of magneto-optical storage media include magneto-optical disk (MO) and the like.

For distributing the program, the program may be stored and sold in the form of a portable storage medium such as DVD, CD-ROM, and the like, for example. The program may also be stored in a storage device of a server computer, and transmitted from the server computer to other computers via a network.

For executing the program on a computer, the computer stores the program recorded in the portable storage medium or the program transmitted from the server computer in its storage device. Then, the computer reads the program from its storage device, and performs processing in accordance with the program. The computer may read the program directly from the portable storage medium, and execute processing in accordance with the program. Another alternative method is that the computer dynamically downloads programs from a server computer when they are demanded, and executes the programs upon delivery.

The above-described processing functions may also be implemented wholly or partly by using electronic circuits such as DSP, ASIC, PLD, and the like.

According to one aspect, a storage apparatus, a storage control method, and a storage system are capable of improving the use efficiency of a high-speed device in a hierarchical control.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage apparatus that records data using a log-structured data writing method and relocates the data between a first storage device and a second storage device having a lower access speed than the first storage device, the storage apparatus comprising:
   a processor configured to perform a procedure including:
   calculating a first expected number of access operations to a first recorded data set, based on a first timing of a next update of the first recorded data set and a first number of access operations to the first recorded data set per unit time, when the first timing is earlier than a second timing of a next relocation of the first recorded data set;
   calculating a second expected number of access operations to a second recorded data set, based on a third timing of a next relocation of the second recorded data set and a second number of access operations to the second recorded data set per unit time, when the third timing is earlier than a fourth timing of a next update of the second recorded data set; and
   placing one or more of recorded data sets with a greater expected number of access operations in the first storage device, the recorded data sets including the first recorded data set and the second recorded data set.

2. The storage apparatus according to claim 1, wherein the first number of access operations is a number of reads of the first recorded data set, and
the second number of access operations is a number of reads of the second recorded data set.

3. The storage apparatus according to claim 1, wherein the procedure further includes calculating an expected number of access operations to each of files, based on an update time interval and a number of reads obtained for each of the files, and selecting the one or more of the recorded data sets to be relocated, in units of files.

4. The storage apparatus according to claim 1, wherein the procedure further includes calculating an expected number of access operations to each of groups each including one or more files, based on an update time interval and a number of reads obtained for each of the files, and selecting the one or more of the recorded data sets to be relocated, in units of groups.

5. The storage apparatus according to claim 1, wherein the procedure further includes calculating an expected number of access operations to each of pages, based on an update time interval and a number of reads obtained for each of the pages, and selecting the one or more of the recorded data sets to be relocated, in units of pages.

6. The storage apparatus according to claim 1, wherein the procedure further includes calculating an expected number of access operations to each of files each including one or more pages, based on an update time interval and a number of reads obtained for each of the pages, and selecting the one or more of the recorded data sets to be relocated, in units of files.

7. The storage apparatus according to claim 1, wherein the procedure further includes calculating an expected number of access operations to each of groups each including one or more pages, based on an update time interval and a number of reads obtained for each of the pages, and selecting the one or more of the recorded data sets to be relocated, in units of groups.

8. A non-transitory computer-readable storage medium storing a storage control program for an information processing apparatus that records data using a log-structured data writing method and relocates the data between a first storage device and a second storage device having a lower access speed than the first storage device, the storage control program causing a computer to perform a procedure comprising:
   calculating a first expected number of access operations to a first recorded data set, based on a first timing of a next update of the first recorded data set and a first number of access operations to the first recorded data set per unit time, when the first timing is earlier than a second timing of a next relocation of the first recorded data set;
   calculating a second expected number of access operations to a second recorded data set, based on a third timing of a next relocation of the second recorded data set and a second number of access operations to the second recorded data set per unit time, when the third timing is earlier than a fourth timing of a next update of the second recorded data set; and
   placing one or more of recorded data sets with a greater expected number of access operations in the first storage device, the recorded data sets including the first recorded data set and the second recorded data set.

9. A storage control method for an information processing apparatus that records data using a log-structured data writing method and relocates the data between a first storage device and a second storage device having a lower access speed than the first storage device, the storage control method comprising:
   calculating, by a processor, a first expected number of access operations to a first recorded data set, based on a first timing of a next update of the first recorded data set and a first number of access operations to the first recorded data set per unit time, when the first timing is earlier than a second timing of a next relocation of the first recorded data set;

calculating, by the processor, a second expected number of access operations to a second recorded data set, based on a third timing of a next relocation of the second recorded data set and a second number of access operations to the second recorded data set per unit time, when the third timing is earlier than a fourth timing of a next update of the second recorded data set; and placing, by the processor, one or more of recorded data sets with a greater expected number of access operations in the first storage device, the recorded data sets including the first recorded data set and the second recorded data set.

* * * * *